US011205125B2

(12) United States Patent
Datta et al.

(10) Patent No.: US 11,205,125 B2
(45) Date of Patent: Dec. 21, 2021

(54) SCHEDULER AND SIMULATOR FOR AN AREA-EFFICIENT, RECONFIGURABLE, ENERGY-EFFICIENT, SPEED-EFFICIENT NEURAL NETWORK

(71) Applicant: INTERNATIONAL BUSINESS MACHINES CORPORATION, Armonk, NY (US)

(72) Inventors: Pallab Datta, San Jose, CA (US); Dharmendra S. Modha, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 754 days.

(21) Appl. No.: 16/024,016

(22) Filed: Jun. 29, 2018

(65) Prior Publication Data

US 2020/0005155 A1 Jan. 2, 2020

(51) Int. Cl.
*G06N 3/10* (2006.01)
*G06F 13/40* (2006.01)
*G06N 3/04* (2006.01)
*G06N 3/063* (2006.01)

(52) U.S. Cl.
CPC .......... *G06N 3/10* (2013.01); *G06F 13/4068* (2013.01); *G06N 3/04* (2013.01); *G06N 3/063* (2013.01)

(58) Field of Classification Search
CPC . G06N 3/063; G06N 3/04; G06N 3/10; G06F 13/4068
See application file for complete search history.

(56) References Cited

U.S. PATENT DOCUMENTS

| | | |
|---|---|---|
| 9,245,222 B2 | 1/2016 | Modha |
| 9,292,787 B2 | 3/2016 | Yu et al. |
| 9,424,284 B2 | 8/2016 | Alvarez-Icaza Rivera et al. |
| 9,466,022 B2 | 10/2016 | Alvarez-Icaza Rivera et al. |
| 9,563,740 B2 | 2/2017 | Abdelghani et al. |
| 9,836,691 B1 | 12/2017 | Narayanaswami et al. |
| 2008/0208372 A1 | 8/2008 | Pannese |
| 2015/0106317 A1 | 4/2015 | Rangan et al. |

(Continued)

OTHER PUBLICATIONS

Sawada, Jun, et al. "Truenorth ecosystem for brain-inspired computing: scalable systems, software, and applications." SC'16: Proceedings of the International Conference for High Performance Computing, Networking, Storage and Analysis. IEEE, 2016. (Year: 2016).*

(Continued)

*Primary Examiner* — Benjamin P Geib
(74) *Attorney, Agent, or Firm* — Erik Huestis; Stephen Kenny; Foley Hoag LLP

(57) ABSTRACT

Mapping of logical neural cores to physical neural cores is provided. In various embodiments, a neural network description describing a plurality of logical cores is read. A plurality of precedence relationships is determined among the plurality of logical cores. Based on the plurality of precedence relationships, a directed acyclic graph among the plurality of logical cores is generated. By breadth first search of the directed acyclic graph, a schedule is generated. The schedule maps each of the plurality of logical cores to one of a plurality of physical cores at one of a plurality of time slices. Execution of the schedule is simulated.

20 Claims, 19 Drawing Sheets

(56) References Cited

U.S. PATENT DOCUMENTS

| | | |
|---|---|---|
| 2016/0335119 A1 | 11/2016 | Merrill et al. |
| 2017/0132496 A1 | 5/2017 | Shoaib et al. |
| 2017/0286825 A1 | 10/2017 | Akopyan et al. |
| 2017/0344882 A1 | 11/2017 | Ambrose et al. |

OTHER PUBLICATIONS

Campos, Pedro, et al. "XL-STaGe: A cross-layer scalable tool for graph generation, evaluation and implementation." 2016 International Conference on Embedded Computer Systems: Architectures, Modeling and Simulation (SAMOS). IEEE, 2016. (Year: 2016).*

Lin, Chit-Kwan, et al. "Mapping spiking neural networks onto a manycore neuromorphic architecture." ACM SIGPLAN Notices 53.4 (2018): 78-89. (Year: 2018).*

Chen et al.; "Combining Competitive Scheme With Slack Neurons To Solve Real-Time Job Scheduling Problem," Expert Systems with Applications, 33: 75-85 (2007).

Daulani et al.; "Precedence Constraint Task Scheduling For Multicore Multikernel Architecture," IOSR Journal of Computer Engineering (IOSR-JCE), 16(4) Ver. II: 43-53 (2014).

Ni et al.; "An Energy-Efficient Digital ReRAM-Crossbar-Based CNN With Bitwise Parallelism," IEEE Journal on Exploratory Solid-State Computational Devices and Circuits: 10 pages (2017).

Peemen et al.; "Memory-Centric Accelerator Design For Convolutional Neural Networks," Proceedings of the 2013 IEEE 31th International Conference on Computer Design (ICCD): 8 pages (2013).

\* cited by examiner

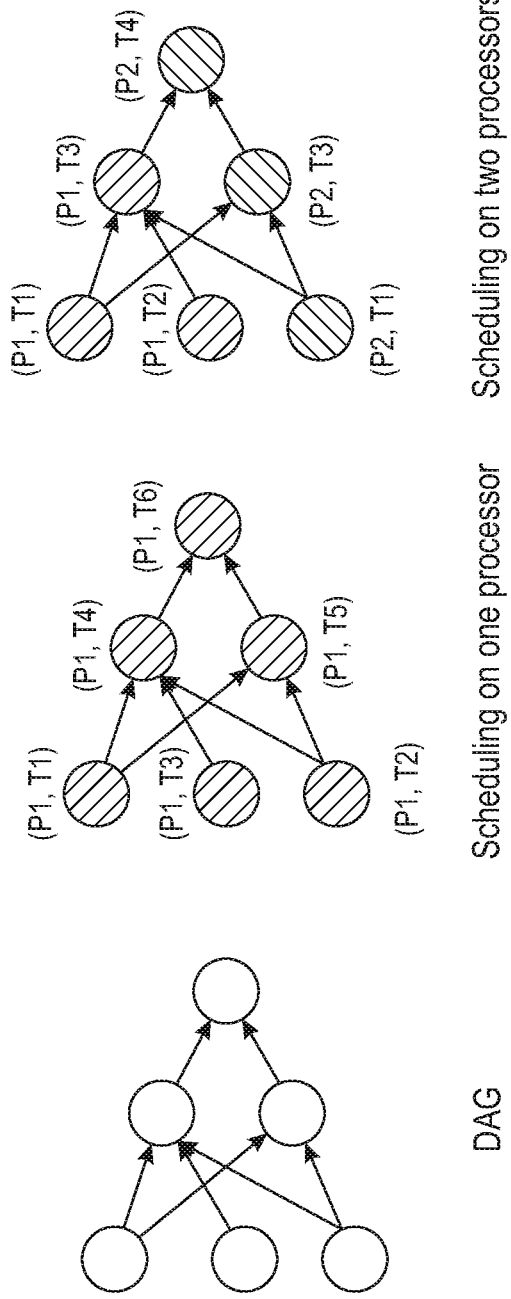

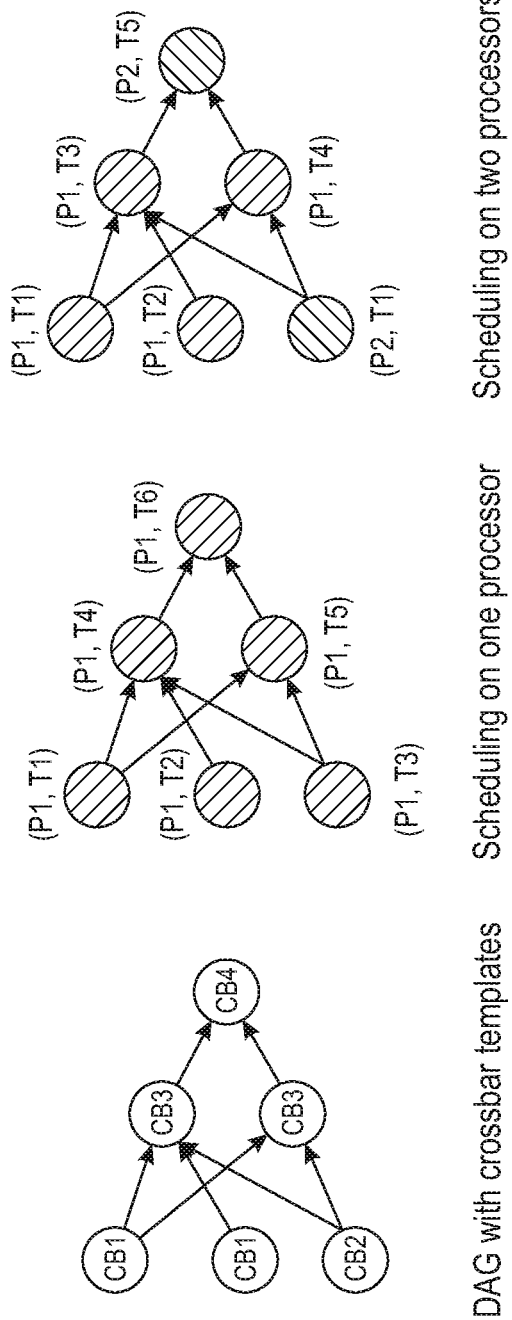

SCHEDULER AND SIMULATOR FOR AN AREA-EFFICIENT, RECONFIGURABLE, ENERGY-EFFICIENT, SPEED-EFFICIENT NEURAL NETWORK

BACKGROUND

Embodiments of the present disclosure relate to mapping logical neural cores to physical neural cores, and more specifically, to a scheduler and simulator for an area-efficient, reconfigurable, energy-efficient, speed-efficient neural network.

BRIEF SUMMARY

According to embodiments of the present disclosure, methods of and computer program products for mapping logical neural cores to physical neural cores are provided. In various embodiments, a neural network description describing a plurality of logical cores is read. A plurality of precedence relationships is determined among the plurality of logical cores. Based on the plurality of precedence relationships, a directed acyclic graph among the plurality of logical cores is generated. By breadth first search of the directed acyclic graph, a schedule is generated. The schedule maps each of the plurality of logical cores to one of a plurality of physical cores at one of a plurality of time slices. Execution of the schedule is simulated.

BRIEF DESCRIPTION OF THE SEVERAL VIEWS OF THE DRAWINGS

FIGS. 3A-C illustrate an exemplary logical to physical scheduling process according to embodiments of the present disclosure.

FIGS. 4A-C illustrate an exemplary layout of core buffers according to embodiments of the present disclosure.

DETAILED DESCRIPTION

Figure 1:
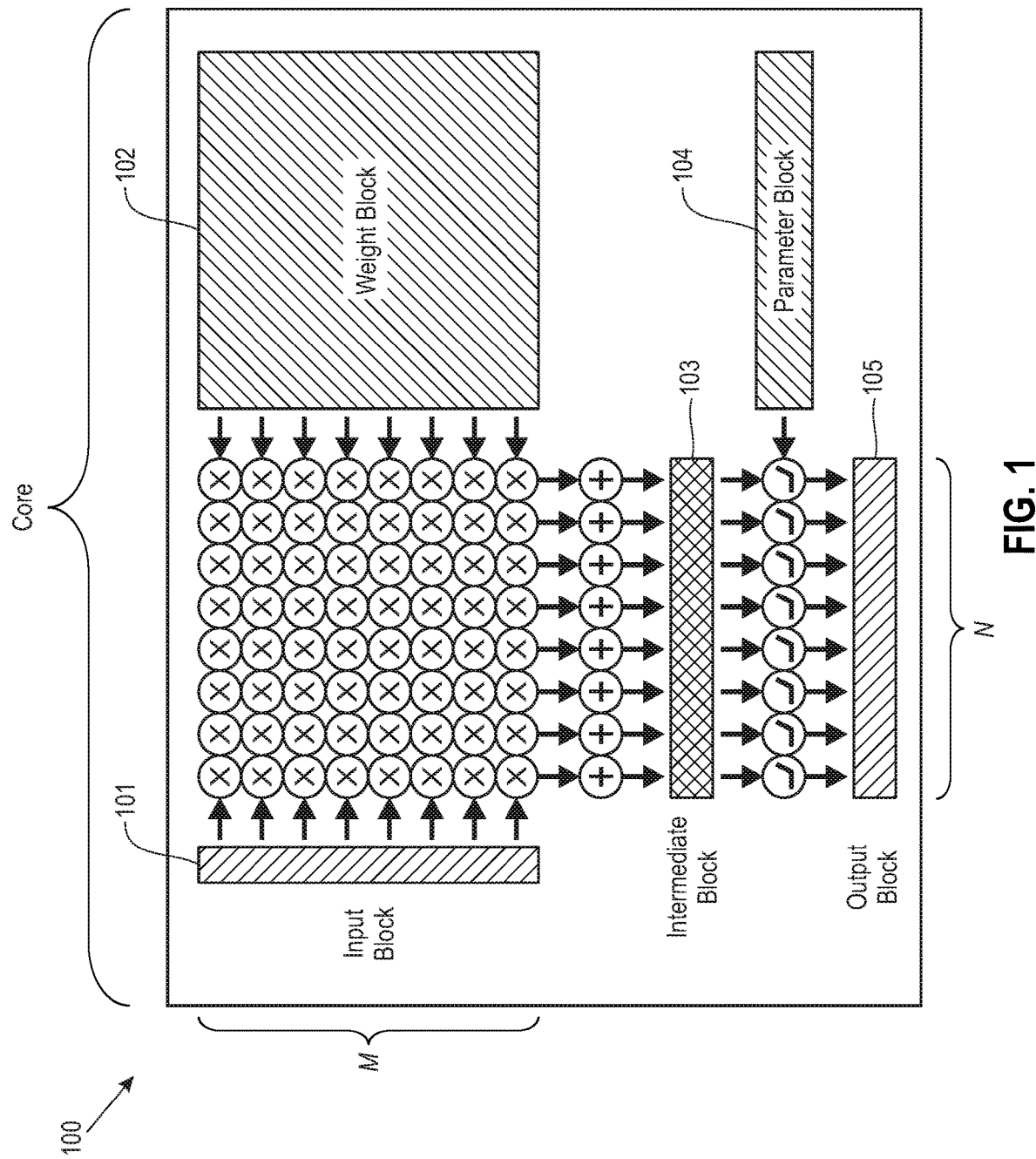
FIG. 1 depicts a neurosynaptic core according to embodiments of the present disclosure.

An artificial neuron is a mathematical function whose output is a nonlinear function of a linear combination of its inputs. Two neurons are connected if the output of one is an input to the other. A weight is a scalar value encoding the strength of the connection between the output of one neuron and the input of another neuron.

A neuron computes its output, called an activation, by applying a nonlinear activation function to a weighted sum of its inputs. A weighted sum is an intermediate result computed by multiplying each input with the corresponding weight and accumulating the products. A partial sum is a weighted sum of a subset of inputs. A weighted sum of all inputs may be computed in stages by accumulating one or more partial sums.

A neural network is a collection of one or more neurons. A neural network is often divided into groups of neurons called layers. A layer is a collection of one or more neurons that all receive input from the same layers and all send output to the same layers, and typically perform a similar function. An input layer is a layer that receives input from a source outside the neural network. An output layer is a layer that sends output to a target outside the neural network. All other layers are intermediate processing layers. A multilayer neural network is a neural network with more than one layer. A deep neural network is a multilayer neural network with many layers.

A tensor is a multidimensional array of numerical values. A tensor block is a contiguous subarray of the elements in a tensor.

Each neural network layer is associated with a parameter tensor V, weight tensor W, input data tensor X, output data tensor Y, and intermediate data tensor Z. The parameter tensor contains all of the parameters that control neuron activation functions a in the layer. The weight tensor contains all of the weights that connect inputs to the layer. The input data tensor contains all of the data that the layer consumes as input. The output data tensor contains all of the data that the layer computes as output. The intermediate data tensor contains any data that the layer produces as intermediate computations, such as partial sums.

The data tensors (input, output, and intermediate) for a layer may be 3-dimensional, where the first two dimensions may be interpreted as encoding spatial location and the third dimension as encoding different features. For example, when a data tensor represents a color image, the first two dimensions encode vertical and horizontal coordinates within the image, and the third dimension encodes the color at each location. Every element of the input data tensor X can be connected to every neuron by a separate weight, so the weight tensor W generally has 6 dimensions, concatenating the 3 dimensions of the input data tensor (input row a, input column b, input feature c) with the 3 dimensions of the output data tensor (output row i, output column j, output feature k). The intermediate data tensor Z has the same shape as the output data tensor Y. The parameter tensor V concatenates the 3 output data tensor dimensions with an additional dimension o that indexes the parameters of the activation function a.

An element of a layer's output data tensor Y can be computed as in Equation 1 where the neuron activation function σ is configured by the vector of activation function parameters V[i,j,k,:], and the weighted sum Z[i,j,k] can be computed as in Equation 2.

$$Y[i, j, k] = \sigma(V[i, j, k, :]; Z[i, j, k]) \quad \text{Equation 1}$$

$$Z[i, j, k] = \sum_{a=1}^{A} \sum_{b=1}^{B} \sum_{c=1}^{C} W[i, j, k, a, b, c] \cdot X[a, b, c] \quad \text{Equation 2}$$

For simplicity of notation, the weighted sum in Equation 2 may be referred to as the output, which is equivalent to using a linear activation function Y[i,j,k]=σ(Z[i,j,k])=Z[i,j,k], with the understanding that the same statements apply without loss of generality when a different activation function is used.

In various embodiments, computation of the output data tensor as described above is decomposed into smaller problems. Each problem may then be solved on one or more neural core, or on one or more core of a conventional multicore system in parallel.

With reference now to FIG. 1, a neural core according to embodiments of the present disclosure is depicted. A neural core 100 is a tileable computational unit that computes one block of an output tensor. A neural core 100 has M inputs and N outputs. In various embodiments, M=N. To compute an output tensor block, a neural core multiplies an M×1 input tensor block 101 with an M×N weight tensor block 102 and accumulates the products into weighted sums that are stored in a 1×N intermediate tensor block 103. A O×N parameter tensor block contains the O parameters that specify each of the N neuron activation functions that are applied to the intermediate tensor block 103 to produce a 1×N output tensor block 105.

Multiple neural cores may be tiled in a neural core array. In some embodiments, the array is 2-dimensional.

A neural network model is a set of constants that collectively specify the entire computation performed by a neural network, including the graph of connections between neurons as well as the weights and activation function parameters for every neuron. Training is the process of modifying the neural network model to perform a desired function. Inference is the process of applying a neural network to an input to produce an output, without modifying the neural network model.

An inference processing unit is a category of processors that perform neural network inference. A neural inference chip is a specific physical instance of an inference processing unit.

Figure 2:
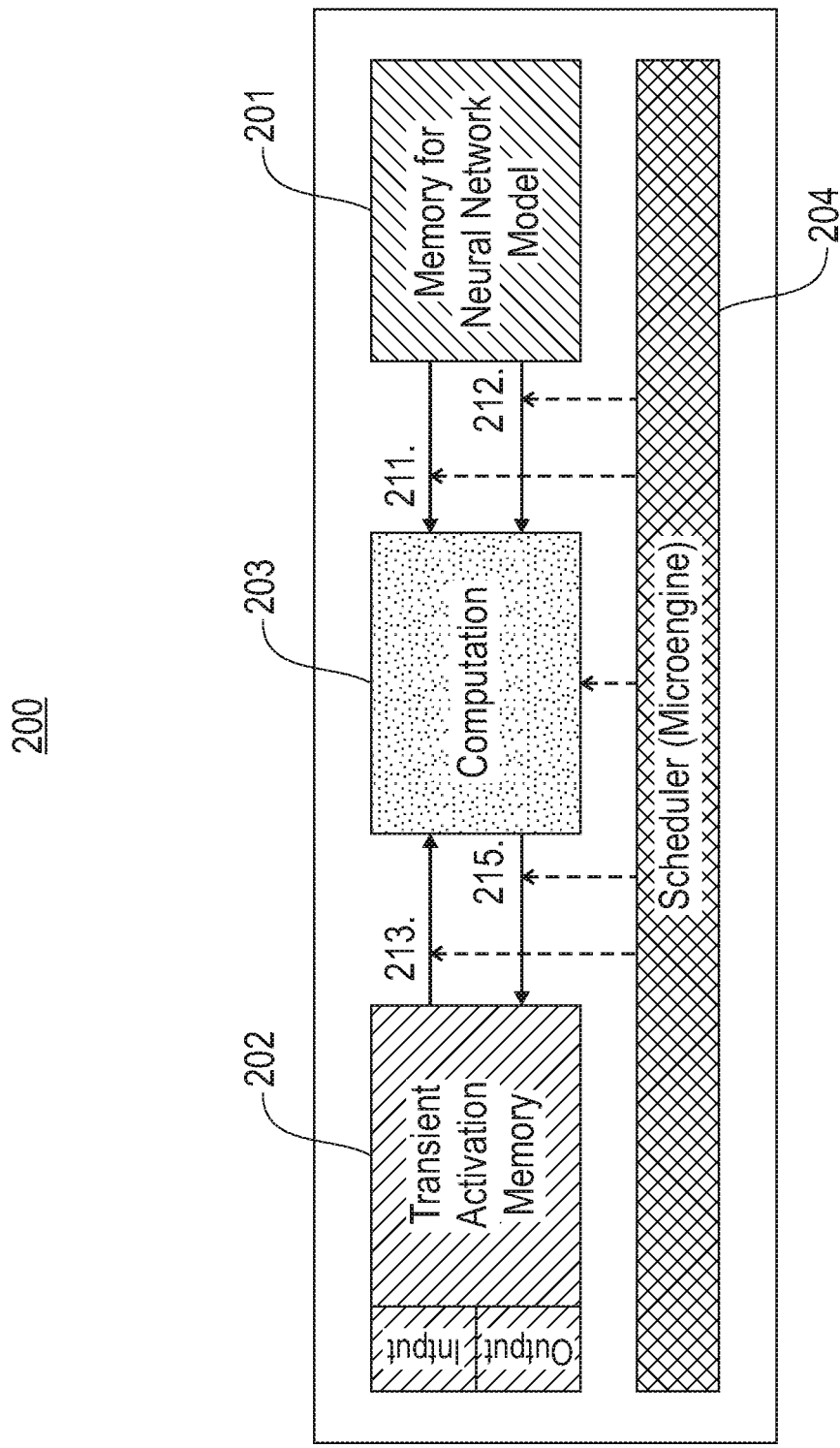
FIG. 2 depicts a neurosynaptic core and mesh router according to embodiments of the present disclosure.

Referring to FIG. 2, an exemplary Inference Processing Unit (IPU) is illustrated according to embodiments of the present disclosure. IPU 200 includes a memory 201 for the neural network model. As described above, the neural network model may include the synapse weights for a neural network to be computed. IPU 200 includes an activation memory 202, which may be transient. Activation memory 202 may be divided into input and output regions, and stores neuron activations for processing. IPU 200 includes a neural computation unit 203, which is loaded with a neural network model from model memory 201. Input activations are provided from activation memory 202 in advance of each computation step. Outputs from neural computation unit 203 are written back to activation memory 202 for processing on the same or another neural computation unit.

In various embodiments a scheduler 204 is included in IPU 200. In such embodiments, all operations in the IPU are directed by the scheduler. As set out below, central and/or distributed schedulers may be provided in various embodiments. A global scheduler may be referred to as a chip microengine, while a local scheduler may be referred to as a core microengine or local controller. In various embodiments a scheduler comprises one or more microengines, microcontrollers, state machines, CPUs, or other controllers.

As set out above, a multi-core platform for neural inference includes per-core distributed activation and partial sum memories, as well as a per-chip shared parameter and instruction memory. Parameters and instructions from shared memory to each core. Activations are passed between cores via an on-chip network. Partial sums can be stored locally or passed between adjacent cores. Shared parameter and instruction memory store a copy of each kernel or access pattern, but can write temporary copies to any or all of the core caches.

It will be appreciated that the present disclosure is application to a variety of alternative configurations of neural processors. One example is described in U.S. application Ser. No. 15/400,319, filed Jan. 6, 2017, entitled Area-Efficient, Reconfigurable, Energy-Efficient, Speed-Efficient Neural Network Substrate, which is hereby incorporated by reference in its entirety.

A logical core according to various embodiment may be defined as a node with a input (incoming) edges and n output (outgoing) edges. A logical core c carries out the computation according to Equation 3 and sends $N_c$ to targets $T_c$. In Equation 3, N and B are n×1 vectors of output neurons and biases, A is an a×1 vector of input axons, W is an n×a weight matrix, and $\sigma_c$ is a function.

$$N_c = \sigma_c(W_c \times A_c + B_c) \quad \text{Equation 3}$$

A network N of logical cores according to various embodiment may be defined according to Equation 4, where C denotes a set of logical cores, E denotes a set of directed edges between logical cores, I is a subset of C that denotes input cores, and O is a subset of C that denotes output cores.

$$N = (I, C, E, O) \quad \text{Equation 4}$$

Consider the case that N is a directed acyclic graph (DAG). Let X denote the input to cores I and let Y denote the output of cores O. In epoch t, input $X_t$ is presented to the network, and the network computes $O_t$. Epoch identifier t is not important from epoch to epoch.

Such a DAG can be used to establish precedence relationship between logical cores. In the above example, input cores in I have no precedent. The precedence relationship between cores is used to ensure that a logical core is scheduled for computation on a physical core only after all logical cores that send incoming edges to it are already scheduled.

Two logical cores $c=(W_c, A_c, B_c, \sigma_c)$ and $d=(W_d, A_d, B_d, \sigma_d)$ are said to be identical iff $W_c = W_d$; $B_c = B_d$; $\sigma_c = \sigma_d$; and neither c is a precedent to d nor d is precedent to c. To perform further optimization of identical cores, each core in a system is assigned an identification number such that all identical cores receive the same identification number.

A physical core is capable of receiving parameters $(W_c, A_c, B_c, \sigma_c)$ for a logical core c. Given these parameters, a physical core can emulate the logical core c to compute $N_c$ and send them to $T_c$.

Suppose a physical core is already loaded with parameters $(W_c, A_c, B_c, \sigma_c)$ for logical core c. Now, for efficiency reasons, it is desirable to reuse these parameters rather than re-receiving them. So, it is desirable to emulate identical cores on the same physical core.

Suppose that there are P physical cores in the system. Let us suppose that these cores operate in lockstep. All cores go through a computation step followed by a communication step followed by a preparation step. To ensure that all communication and preparation is done, there can be a communication barrier requiring O(log P) time where all cores acknowledge that they are done and all messages are delivered.

According to various embodiments, a schedule maps the set of logical cores in a system to physical cores along with a sequence number. Given precedence and identity relationships between logical cores, it is desirable to map identical logical cores to the same physical core for energy-efficiency and to map logical cores to physical cores so as to minimize total run-time for the network. In some embodiments, these two preferences may conflict and in some embodiments, one or the other is optimized.

In some embodiments, a scheduler is provided to create a schedule. According to various embodiments, the scheduler ensures that for a given physical core and for a given sequence number, the core has all the necessary ingredients. In particular, the scheduler ensures that a given physical core is properly configured with $(W_c, A_c, B_c, \sigma_c)$ and that $T_c$ is available to receive $N_c$ upon computation.

According to some embodiments, neuron biases and destinations are loaded on a regular schedule. In some embodiments, weights are loaded on an irregular schedule depending upon weight reuse. In some embodiments, neuron firings move from source physical cores to destination physical core after each computation step.

A physical core is capable of receiving parameters $(W_c, A_c, B_c, \sigma_c)$ for a logical core c. Given these parameters, a physical core can emulate the logical core c to compute $N_c$ and send to $T_c$. Accordingly, network computation can be self-scheduling, in which case physical cores send messages to one another without a central authority. However, self-scheduling or distributed scheduling is limited by the size of a physical core's axon buffers. Thus, a breadth-first schedule (BFS) is preferred in various embodiments to a depth-first schedule (DFS). In particular, during graph traversal, BFS schedules cores in the order that they are discovered. For example, with BFS, for a layer-wise network, cores within each layer are scheduled first before cores in the next layer. If the amount of computation that is scheduled cannot be self-scheduled, it will need to be buffered off-core.

Referring to FIG. 3, a directed acyclic graph (DAG) of logical processors is illustrated. Scheduling algorithms according to the present disclosure map the logical processors to a given number of physical processors.

In FIG. 3A, the network of logical cores is illustrated as a DAG without a schedule.

In FIG. 3B, a schedule is provided for a system having one physical processor (denoted P1). The allocation of the physical processor at each time window is denoted T1 . . . T6. This exemplary schedule is generated by the minimum scheduling delay algorithm as described further below. All cores are assigned to physical core P1. The sequence of assignment is T1, T2, T3, T4, T5, and T6. This assignment assigns T4 after T1, T2, and T3 are complete; assigns T5 after T1 and T2 are complete; and assigns T6 after T4 and T5 are complete.

It will be appreciated that there are a variety of schedules possible that preserve precedence among logical cores. In various embodiments, a schedule is generated that minimizes the latency in scheduling the network of logical cores. The minimum latency schedule depends upon the nature of network of logical cores.

Referring to FIG. 3C, an exemplary mapping of the network of logical cores to a set of two physical cores is shown (denoted P1 and P2). P1 and P2 operate in parallel, allowing the whole graph to be executed in 4 steps. In this example, P2 is idle in the second time window T2.

For a given DAG of depth D, when scheduled in a simply parallel neuromorphic substrate it would be computed in D ticks. However, when mapping a graph of K cores as set out herein, the entire graph can be computed in K ticks. The comparative expansion in the processing time-line is thus K/D. As the number of physical processors is scaled up, the processing time-line would approach D and so the scheduling time scale ratio would approach 1. The exact ratio is dependent both on the scheduling algorithm chosen as well as the complexity and the nature of the DAG.

As seen through comparison of FIGS. 3B and 3C, as the number of physical processors is increased from one to two, the number of time-slots needed to complete the scheduling of the logical network onto the physical processors decreases from six to four.

Referring to FIGS. 4A-C, a directed acyclic graph (DAG) of logical processors is illustrated with crossbar templates. As described above, the configuration parameters of a given logical core include the synaptic weights applied during computation. Reloading said weights at each time cycle requires time and energy. Accordingly, it is advantageous to schedule a given physical core to consecutively execute logical cores having the same crossbar template.

FIG. 4A shows the same directed-acyclic graph of logical cores as FIG. 3A, with their corresponding crossbar prototypes. FIGS. 4B-4C show the scheduling of the DAG onto one physical processor and two physical processors, respectively. In various embodiments, the scheduling algorithm schedules logical processors onto physical processors such that the cost for crossbar reconfiguration across all physical processors is minimized. This different objective function can lead to a schedule that has different scheduling delay as compared to the minimum scheduling delay algorithm. The cost for crossbar reconfiguration can be quite different in the case of the minimum scheduling delay algorithm vs. the minimum crossbar reconfiguration algorithm.

Accordingly, the schedule outcome on two physical processors can be slightly different as compared to the minimum scheduling delay algorithm. In the example of two physical processors, the minimum scheduling delay algorithm yields a schedule requiring four time-steps, whereas the minimum crossbar switch algorithm requires five time steps. However in the case of the minimum scheduling delay algorithm, the number of crossbar switches is three compared to two for the minimum crossbar switch algorithm. Accordingly, these two approaches represent a tradeoff.

Referring to Inset 1, pseudocode is provided for a minimum scheduling delay algorithm according to embodiments of the present disclosure.

---

Inset 1

Require: Graph G = (V, E) where
    v ∈ V is a corelet and
    e ∈ E is an edge between neurosynaptic cores
P: number of physical processors Inset 1

```
Procedure: MinSchedulingDelayScheduler
    Step A: Preprocessing Step
        for v ∈ V do
            V^in(v) ← list of incoming adjacent vertices of v
            V^out(v) ← list of outgoing adjacent vertices of v
        end for
    Step B: Computing Identical Cores
        Each logical core is assigned an Identification Number
        such that two logical cores c = (W_c,A_c,B_c,σ_c) and
        d = (W_d,A_d,B_d,σ_d) are identical iff W_c = W_d, B_c = B_d,
        σ_c = σ_d and c = ·d
            All cores are assigned an identification number such that
            all identical cores receive the same identification number
    Step C: Computing Schedule for (D-1) Layers
        Let D be maximum depth of graph G
        Let v_j^d denote the i^th core at depth d
        Let v_(i,d)^Din denote the in-degree of the i^th core at depth d
        Let v_(i,d)^Dout denote the out-degree of the i^th core at depth d
        for d ← 1 to (D-1) do
            for select a core v_j^{d+1} | v_(j,d+1)^Din ≠ 0 & min_{∀j∈(d+1)} v_(j,d+1)^Din
            do
                Let S_d = V^in(v_j^{d+1}) is the set of cores precedent to
                core v_j^{d+1}
                Schedule the set S_d on P processors.
                Look at all scheduled cores S_d^t, and see which cores in
                Layer (d+1) they connect to.
                Let us denote S_{d+1}^t = V^out(S_d^t) to be the set of cores
                projected to by S_d^t.
                Use v_(i,d)^Dout to compute the in-degree for each core in
                S_{d+1}^t
                Select a core v_j^{d+1} | it is maximally projected to from
                Layer d
            end for
        end for
    Step D: Comuting Schedule for D^th Layer
        while all cores v_j^D are scheduled do
            Look at all scheduled cores at Layer (D-1), and see which
            cores in Layer D they connect to.
            Let us denote S_D^t to be the set of cores projected to by
            all the scheduled cores
            Use v_(i,D-1)^out to compute the in-degree for each core in S_D^t
            Select a core v_j^D | it is maximally projected to from Layer
            D-1
        End while
```

Referring to Inset 2, pseudocode is provided for a minimum crossbar switch algorithm according to embodiments of the present disclosure.

```
Require: Graph G = (V,E) where
            v ∈ V is a corelet and
            e ∈ E is an edge between neurosynaptic cores
            P: number of physical processors
Procedure: MinCrossbarSwitchScheduler
    Step A: Preprocessing Step
        for v ∈ V do
            V^in(v) ← list of incoming adjacent vertices of v
            V^out(v) ← list of outgoing adjacent vertices of v
        end for
    Step B: Computing Identical Cores
        Each logical core is assigned an Identification Num-
        ber such that two logical cores c = (W_c,A_c,B_c,σ_c) and
        d = (W_d,A_d,B_d,σ_d) are identical iff W_c = W_d, B_c = B_d,
        σ_c = σ_d and c = ·d
            All cores are assigned an identification number such that
            all identical cores receive the same identification number
    Step C: Computing Schedule for D Layers
        Let D be the maximum depth of graph G
        Let v_j^d denote the i^th core at depth d
        Let CB_d be the total number of unique cross-bars across all
        cores at depth d of the graph
        Let CX_(i,d)^t denote the crossbar type of the i^th core at depth
        d allocated on time-slot t
        for d ← 1 to D do
            while all cores v_j^d are scheduled do
                Select a processor p ∈ P such that p is the least used
                for scheduling
                Identify the Crossbar type CX_(i,d)^t of the core that was
                allocated on processor p in the last time-slot t
                if There are un-scheduled cores of the same crossbar
                type on processor p then
                    Schedule a core v_j^d of the same crossbar type on
                    processor p in the current time-slot
                    Increment Time-slot on processor p
                else
                    Allocate any core v_j^d on processor p in the current
                    time-slot
                    Increment Time-slot on processor p
                end if
            end while
        end for
```

Once a given network of logical cores has been scheduled by one of the above algorithms onto the set of physical cores, the scheduling delay across all P physical processors is computed. The scheduling delay of a processor can be computed by subtracting the minimum time-slot at which it could have been scheduled based on the minimum scheduling time of all its predecessors across P processors and the actual time slot at which it gets scheduled on any one of the processors.

Figure 5A:
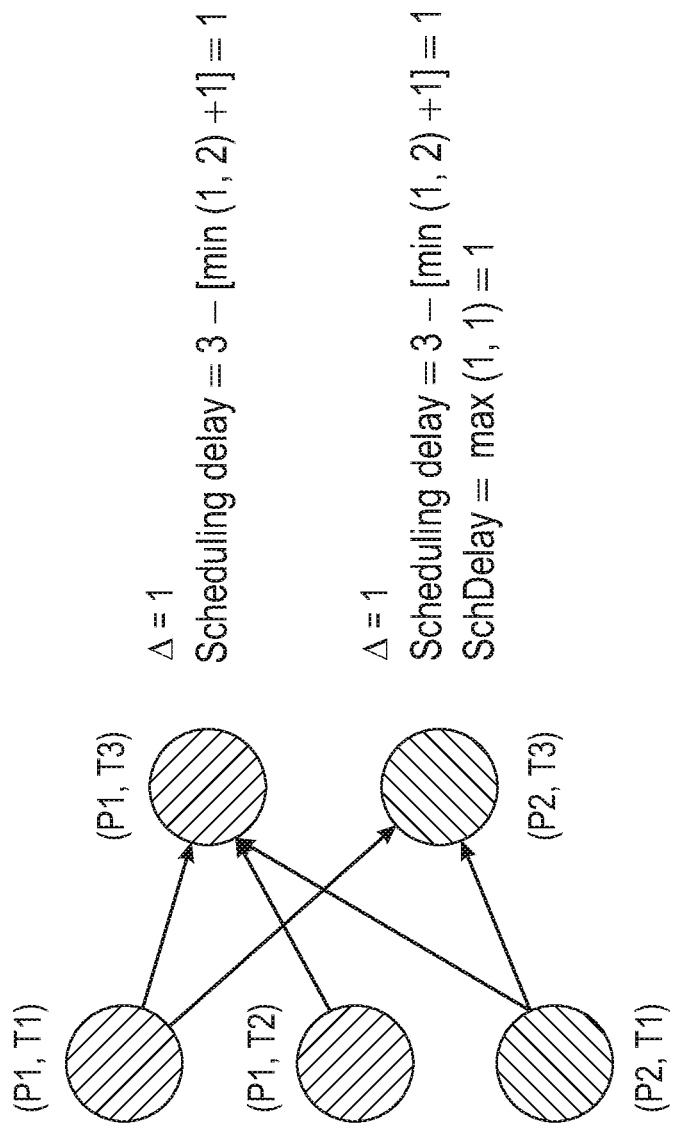
FIGS. 5A-B illustrate the scheduling delay for exemplary schedules according to minimum scheduling delay and minimum crossbar switch algorithms according to embodiments of the present disclosure.
Figure 5B:
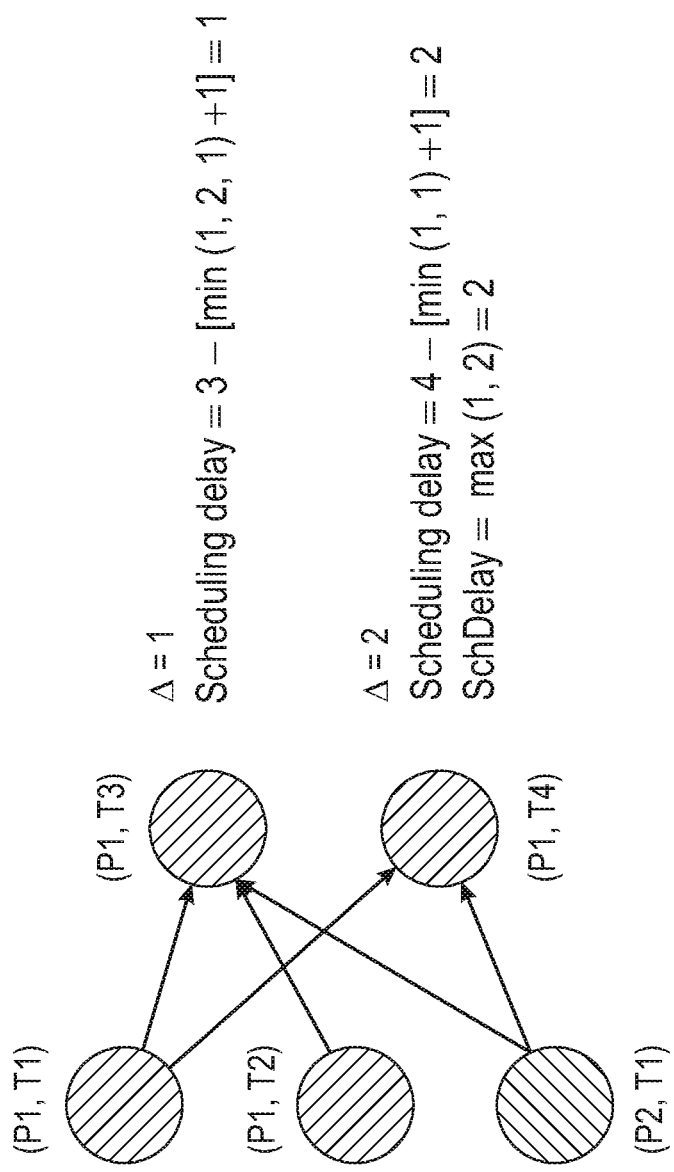

Referring to FIGS. 5A-B, the scheduling delay for exemplary schedules according to the minimum scheduling delay and minimum crossbar switch algorithms are illustrated. As shown, the scheduling delay can vary depending on the choice of scheduling algorithm. The overall scheduling delay of the entire network is computed by taking the maximum scheduling delay across all the logical cores of the network. As shown in FIG. 5A, the scheduling delay of this exemplary DAG for the minimum scheduling delay algorithm is equal to 1. As shown in FIG. 5B, the scheduling delay of the minimum crossbar switch algorithm is equal to 2. Thus, there is a tradeoff between a scheduling algorithm which can impact the scheduling delay of a given logical network on a given number of physical processors.

Figure 6:
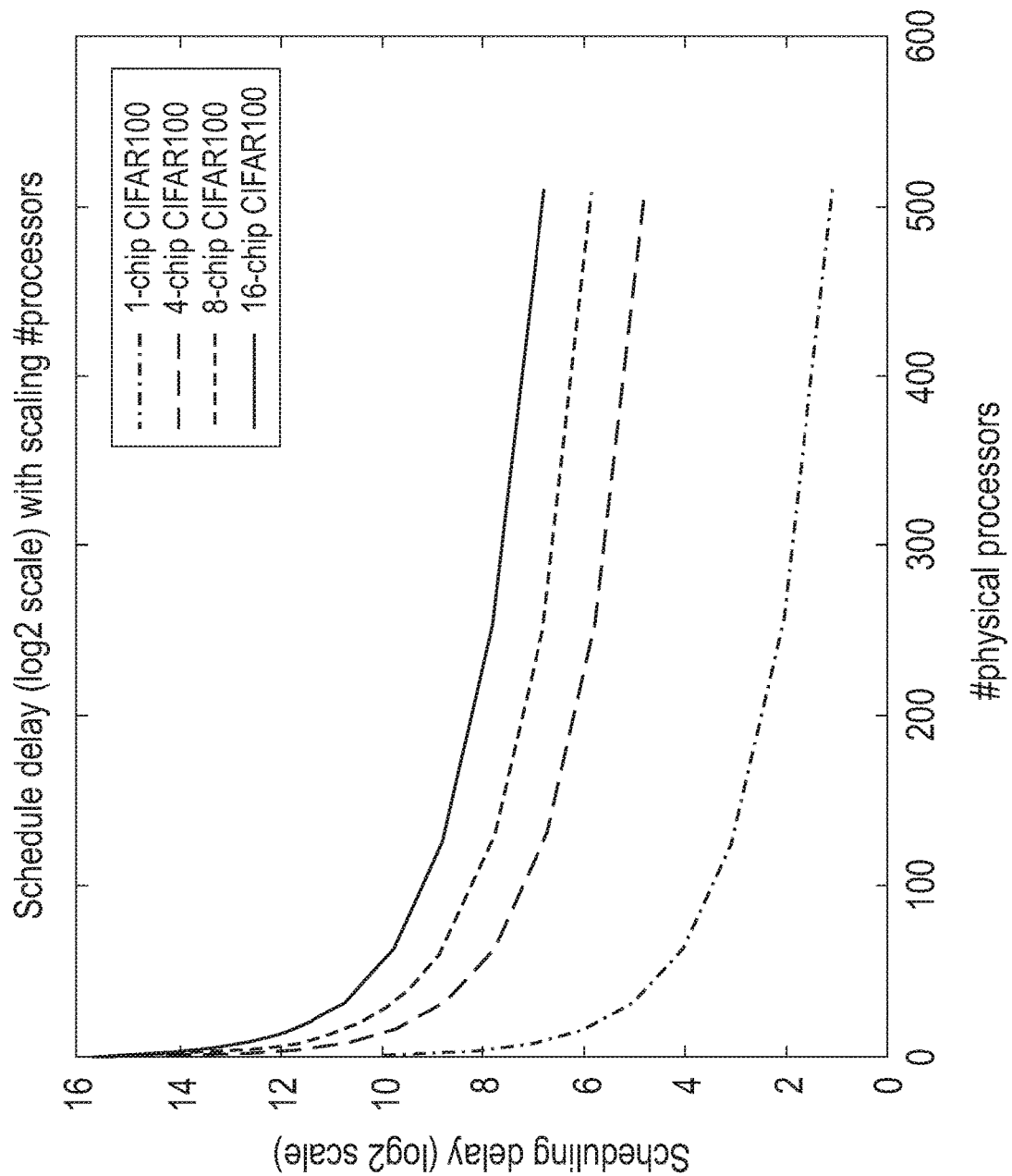
FIG. 6 is a chart of schedule delay relative to number of physical processors for various exemplary networks according to embodiments of the present disclosure.

Referring to FIG. 6, schedule delay is charted relative to number of physical processors for various exemplary networks. This illustrates the impact of the scaling number of physical processors on the scheduling delay of single and multiple multi-chip neurosynaptic networks.

After a given network of logical cores has been scheduled on physical cores by one of the above algorithms, the schedule is executed on the available physical processors. During execution of the schedule, the neuron activations from preceding cores (from a from a prior layer) may need to be buffered (e.g., in an on-chip buffer) before they can be consumed by the target core for computation. Thus, in some embodiments, each physical core has a queue of future neuron activations.

Given a schedule, the minimum depth of this queue may be computed that would be sufficient to store all pending activations at all points in the schedule. If this minimum size is met, storage of neuron activations off-core may be avoided, thereby avoiding the space and energy costs of performing off-core transactions. This is referred to as minimum queue depth.

Figure 7A:
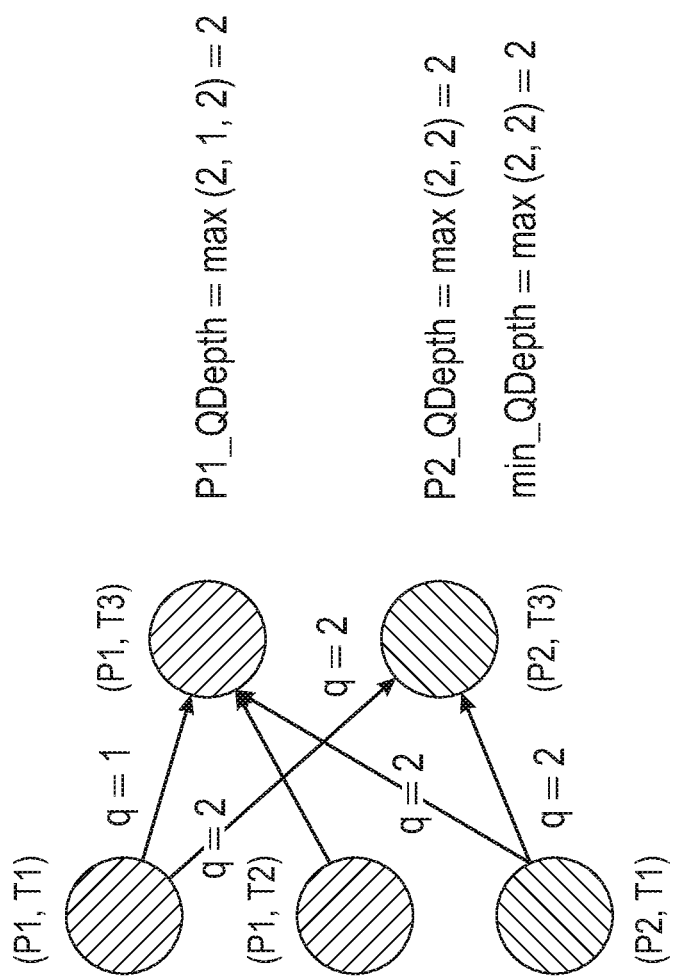
FIGS. 7A-B illustrates minimum queue depth for an exemplary two-layer network of logical cores according to embodiments of the present disclosure.
Figure 7B:
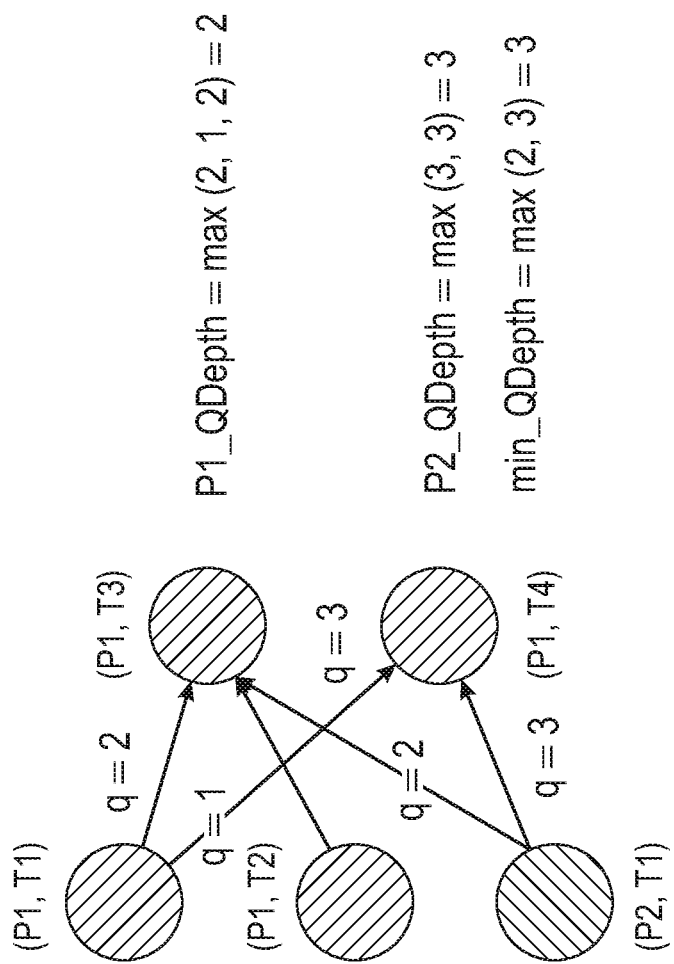

Referring to FIGS. 7A-B, minimum queue depth is illustrated for an exemplary two-layer network of logical. In FIG. 7A, a schedule is shown generated via the minimum scheduling algorithm. In FIG. 7B, schedule is shown generated via the minimum crossbar switch algorithm. In this example, the queue depth along each edge is given as q.

Referring to Inset 3, pseudocode is provided for an algorithm for schedule execution on physical processors. This is used to execute or simulate execution given a schedule. The minimum queue depth required is computed after execution of the schedule by the simulator.

```
Require: Graph G = (V,E) where
    v ∈ V is a corelet and
    e ∈ E is an edge between neurosynaptic cores
    P: number of physical processors
    P_l → (P_p, t): defines the schedule of mapping of a
    logical core P_l to physical processor P_p at time slot t.
Procedure: ExecutionSchedulePhysicalProcessors
    Step A: Preprocessing Step
    for v ∈ V do
        V^in(v), V^out(v) list of incoming & outgoing adjacent
        vertices of v
        Let D be the maximum depth of graph G
        Let v_i^d denote the i^th core at depth d
    end for
    Step B: Executing Schedule for the 1^st Layer
    Let T_1: time-slots Layer_1 cores have been mapped
    Let P_1: physical processors that Layer_1 cores are mapped.
    ∀ p spikeArrivalTime_{P_p} = ∅
    ∀ p spikeTimeQueue_{P_p} = ∅
    for t ∈ T_1 do
        for p ∈ P_1 do
            for select a core d ∈ V^out(v_{(p,1)}) do
                Obtain physical processor allocation for core d from
                P_l → (P_p, t)
                spikeArrivalTime_{P_p} ←spikeArrivalTime_{P_p} ∪ δ where
                δ is the spike delay from p → d
                for weight w ← 1 to α do
                    spikeTimeQueue_{P_p} ←spikeTimeQueue_{P_p} ∪ δ
                end for
            end for
        end for
    end for
    Step C: Executing Schedule for D^th Layer
    for layer index l ← 2 to D do
        for processor p ← 1 to P do
            Let us denote S_p denote the set of cores scheduled on
            processor p.
            spikeArrivalTime_p: denotes the set of spike arrival
            times from all predecessors of Sp
            for m ← 1 to | S_p | do
                processorQDepth_p ←processorQDepth_p ∪
                    (t - min(spikeArrivalTime_p)),
                    where t is defined from S_p → (p, t)
            end for
        end for
        Let T_l: time-slots Layer_l cores have been mapped
        Let P_l: physical processors that Layer_l cores are mapped.
        for t ∈ T_l do
            for p ∈ P_l do
                for select a core d ∈ V^out(v_{(p,1)}) do
                    spikeArrivalTime_{P_p} ←spikeArrivalTime_{P_p} ∪ (t+δ)
                    for weight w ← 1 to α do
                        spikeTimeQueue_{P_p} ←spikeTimeQueue_{P_p} ∪ (t+δ)
                    end for
                end for
            end for
        end for
    end for
```

Figure 8:
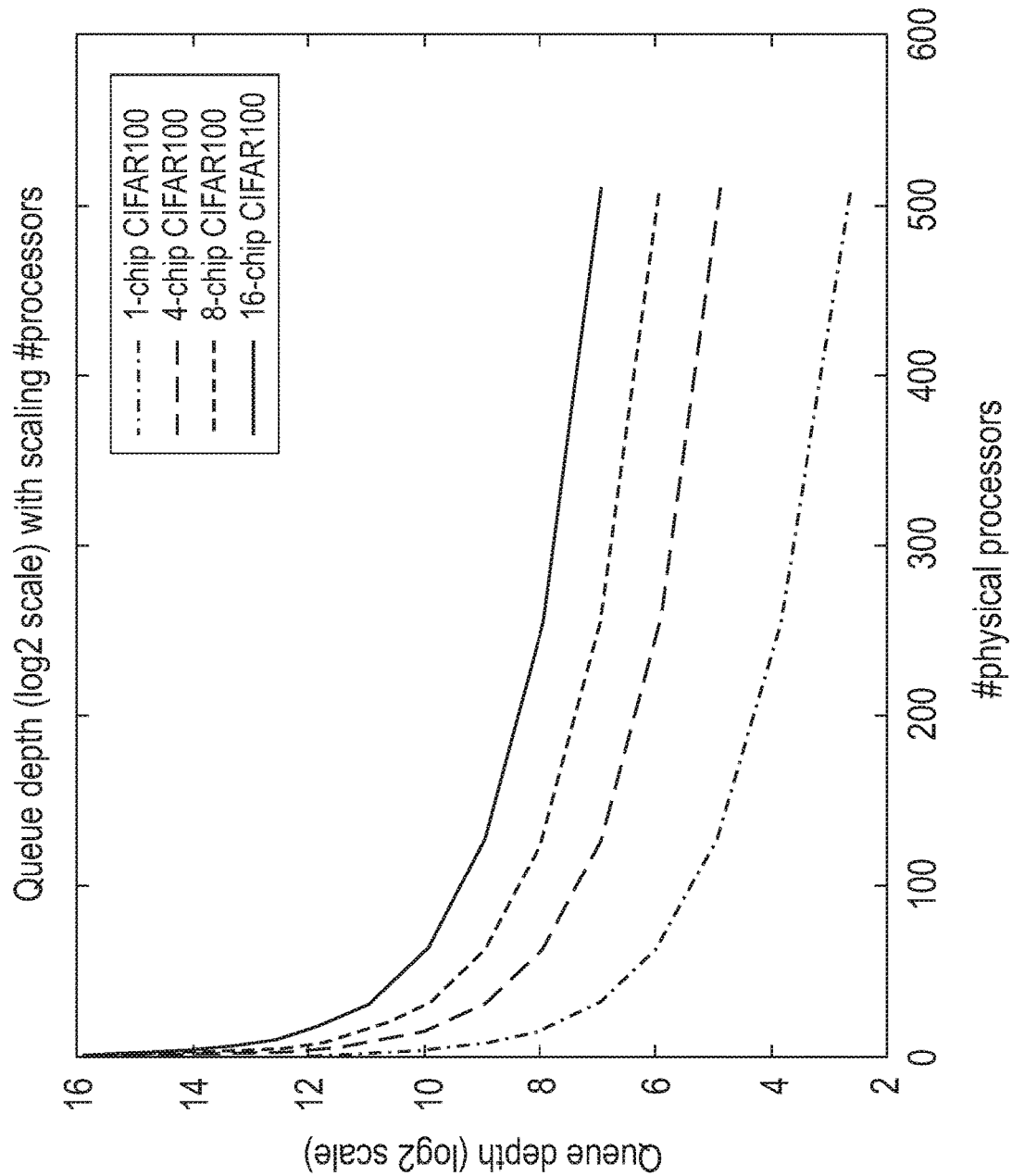
FIG. 8 is a chart of queue depth relative to number of physical processors for various exemplary networks according to embodiments of the present disclosure.

Referring to FIG. 8, queue depth is charted relative to number of physical processors for various exemplary networks. This illustrates the impact of scaling the number of physical processors when mapping multiple networks of different sizes onto the physical processors with minimum scheduling delay algorithm (as an example).

Figure 9:
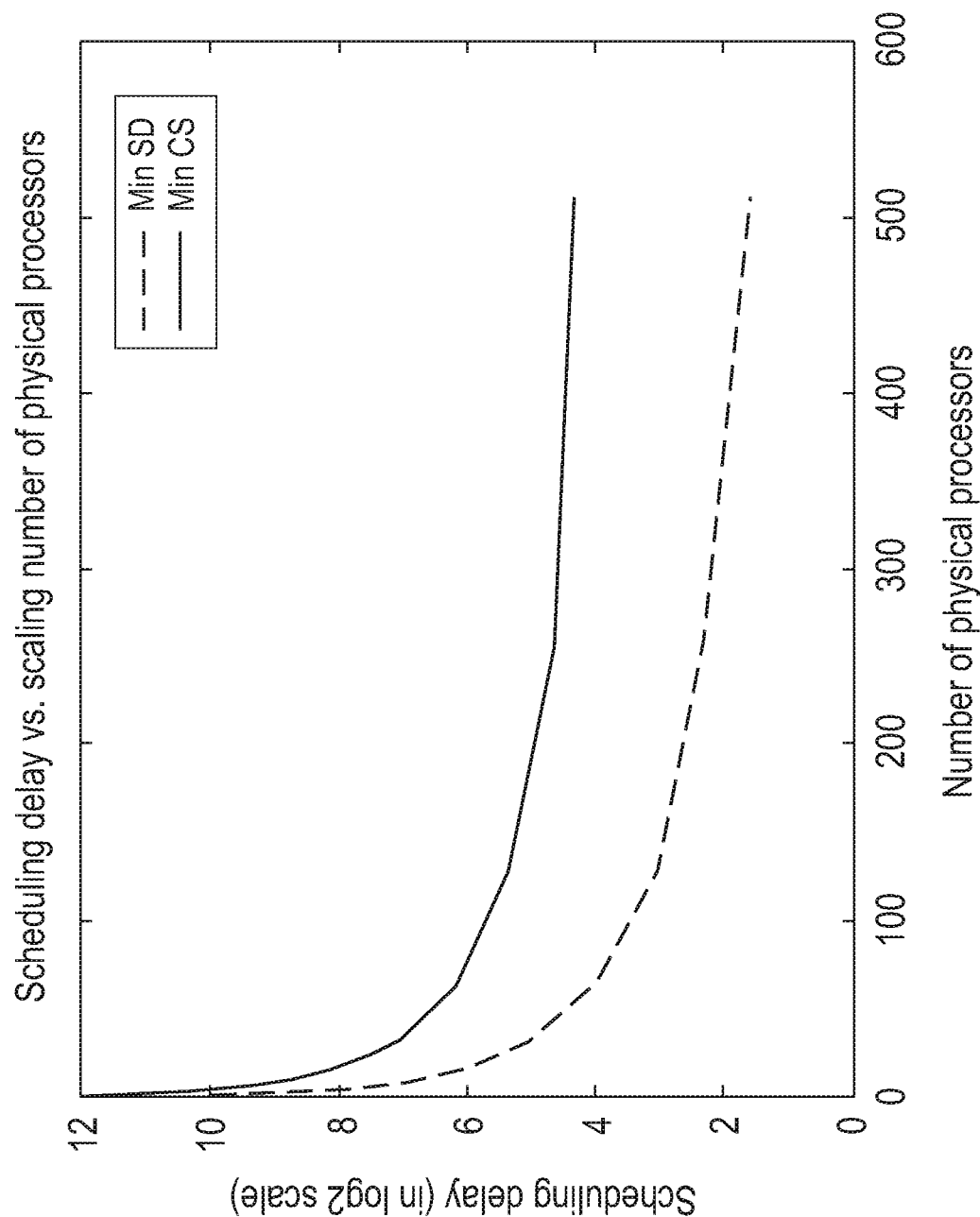
FIG. 9 is a chart of scheduling depth for minimum schedule delay and minimum crossbar switch algorithms according to embodiments of the present disclosure.
Figure 10:
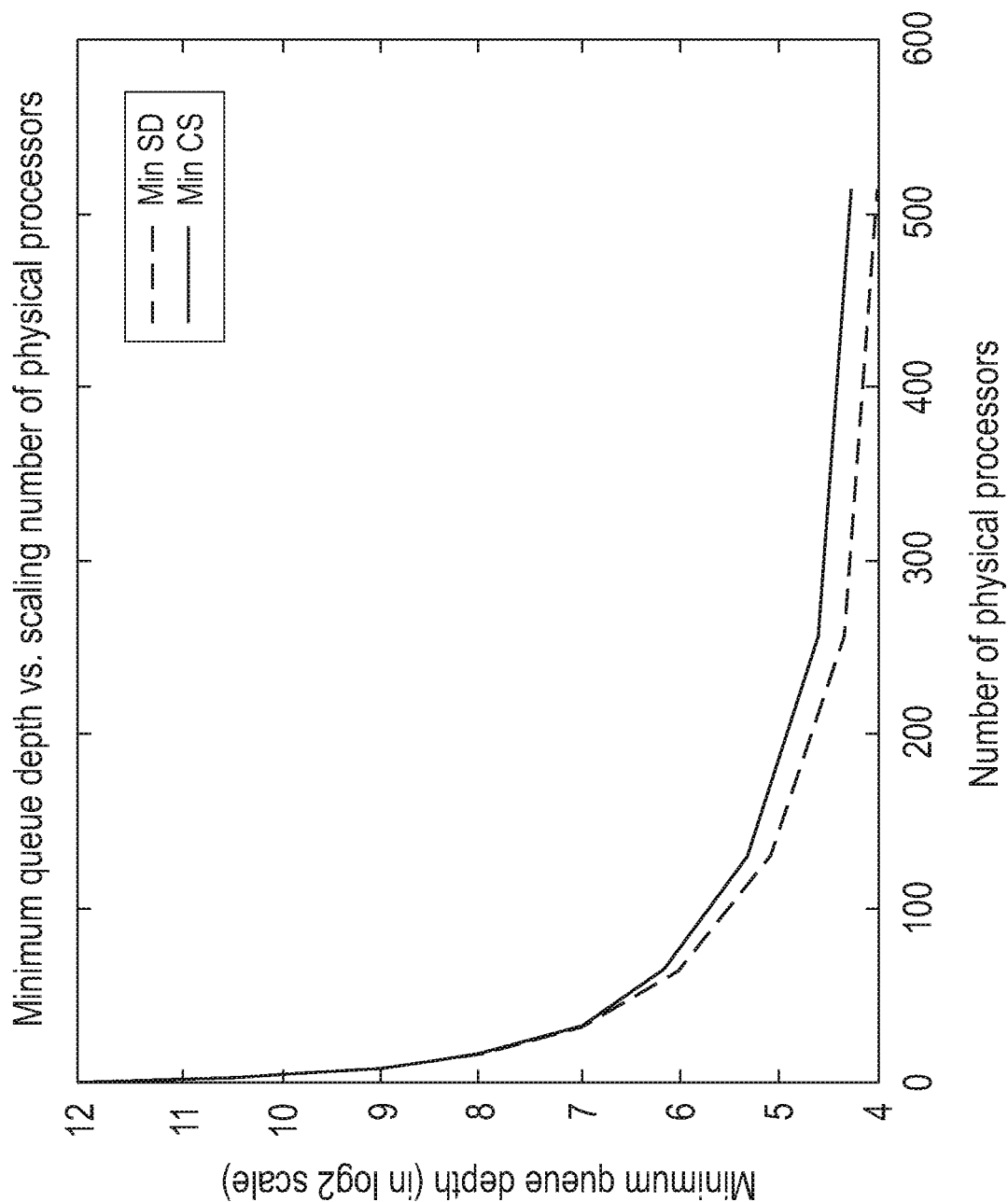
FIG. 10 is a chart of queue depth for minimum schedule delay and minimum crossbar switch algorithms according to embodiments of the present disclosure.

Referring to FIGS. 9-10, the minimum schedule delay and minimum crossbar switch algorithms are compared with respect to scheduling depth and queue depth. FIG. 9 shows scheduling delay relative to number of physical processors for minimum schedule delay and minimum crossbar switch. FIG. 10 shows queue depth relative to number of physical processors for minimum schedule delay and minimum crossbar switch.

Figure 11:
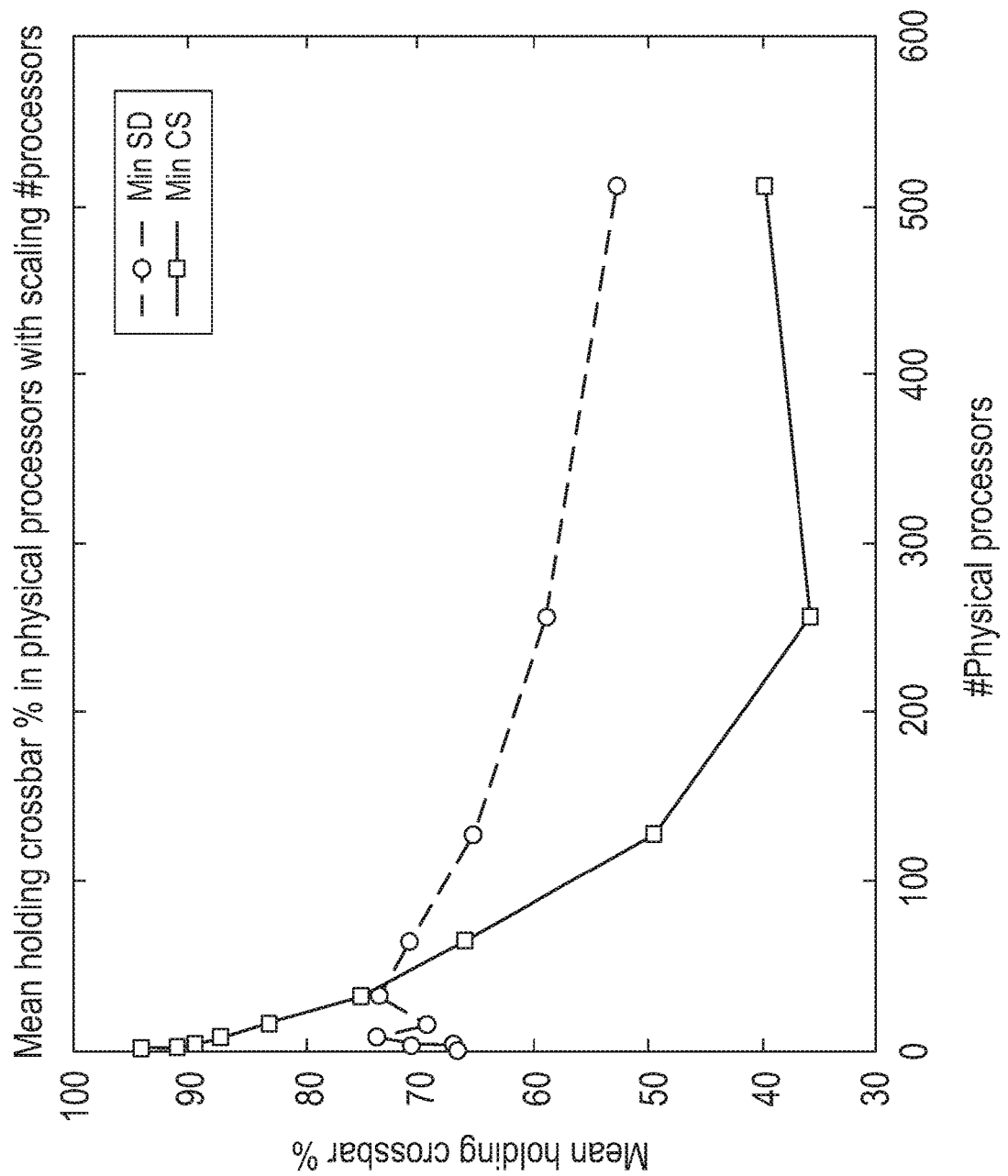
FIG. 11 shows the mean crossbar retention percentage across all physical processors for minimum scheduling delay and minimum crossbar switch algorithms according to embodiments of the present disclosure.

FIG. 11 shows the mean crossbar retention percentage across all physical processors for the minimum scheduling delay algorithm and the minimum crossbar switch algorithm as the number of physical processors scales. In this example, 4042 logical core CIFAR 100 network is mapped to the physical processors. This illustrates the trade-off between scheduling delay and the average or maximum cross-bar retention ratio. These two objective functions can be conflicting depending on the choice of scheduling algorithm and the nature or the complexity of the underlying DAG.

Figure 12:
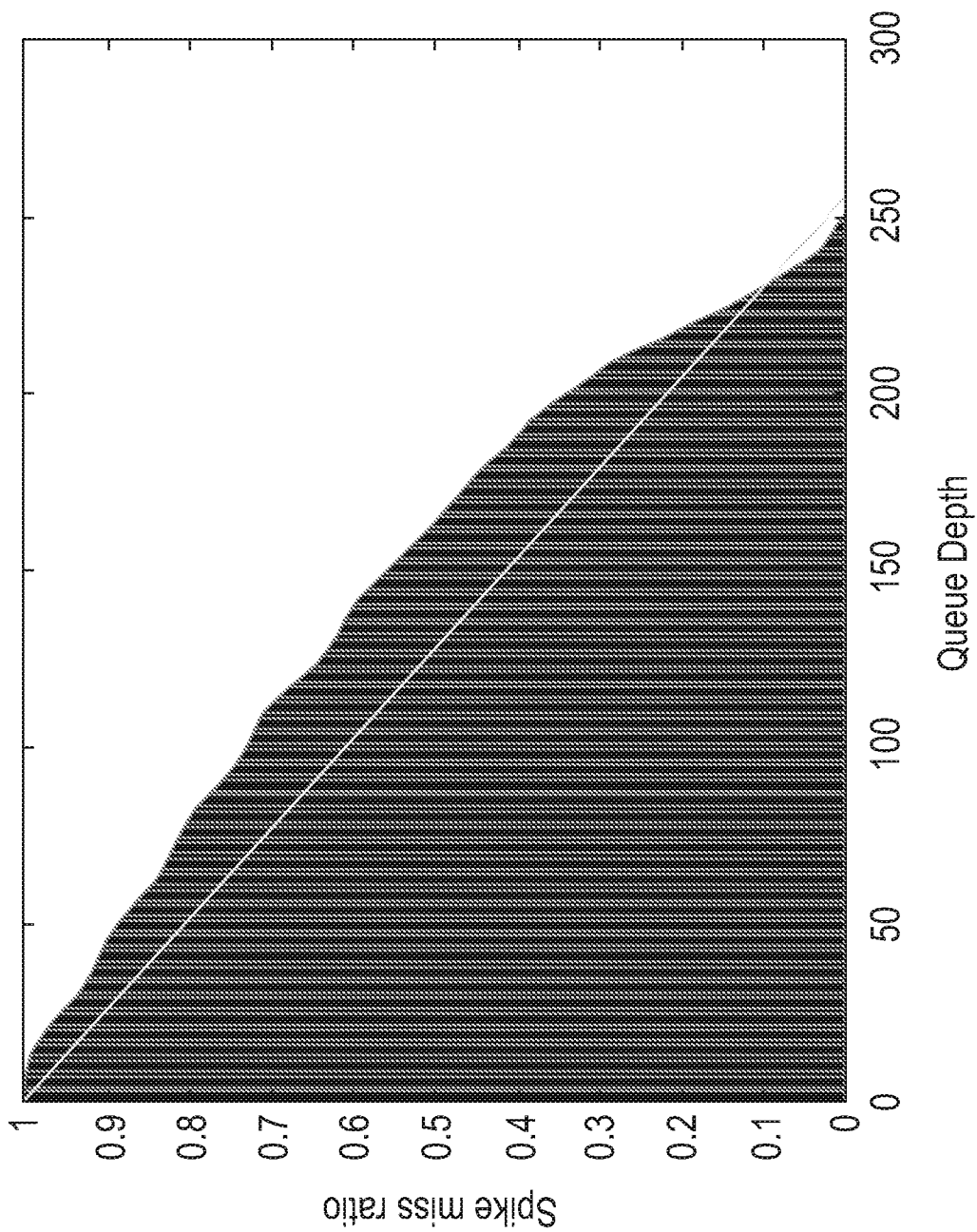
FIGS. 12-13 are charts of the neuron activation miss ratio relative to queue depth for 16 and 64 physical processors respectively according to embodiments of the present disclosure.
Figure 13:
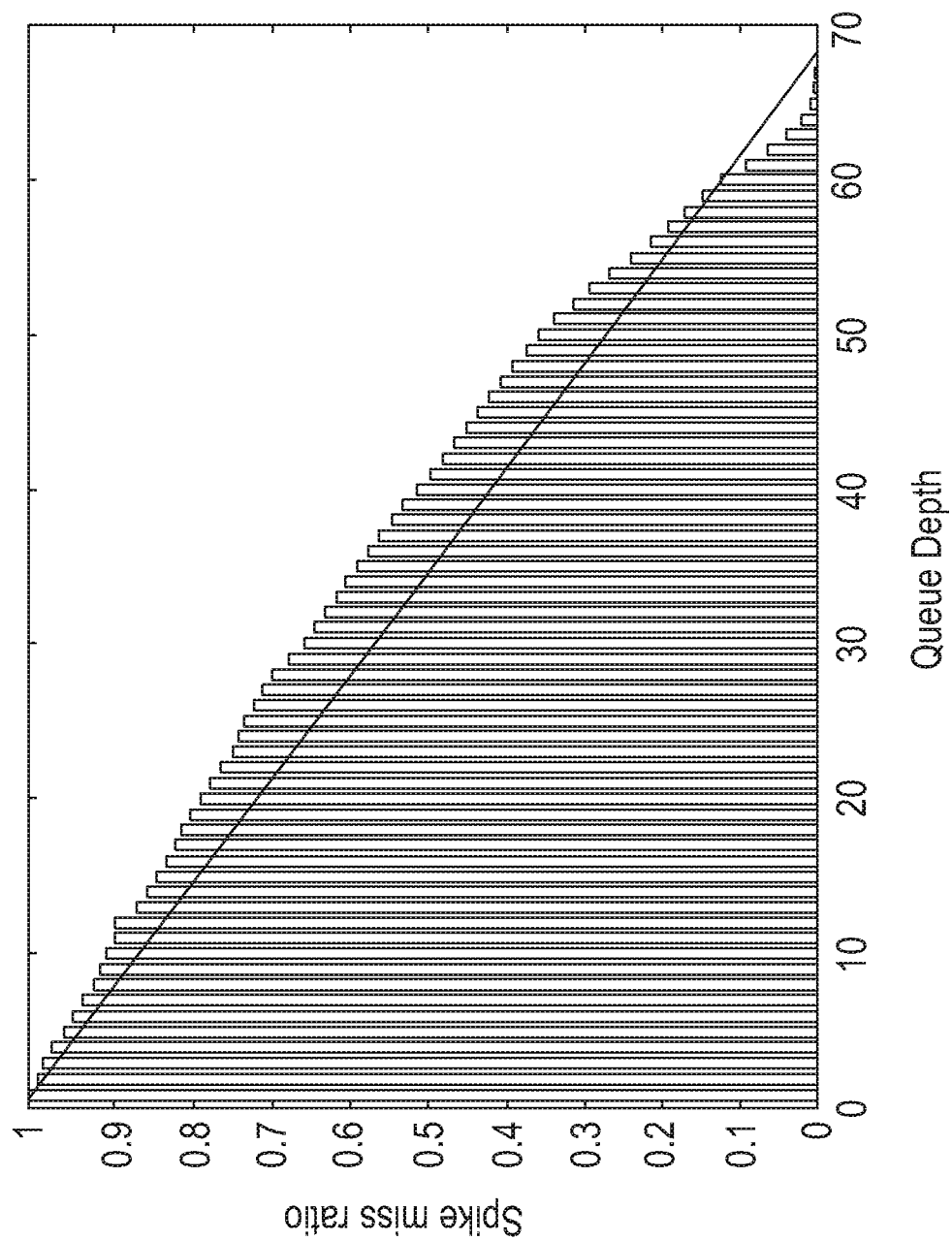

Referring to FIGS. 12-13, the neuron activation miss ratio is charted relative to queue depth for 16 and 64 physical processors respectively. In this example, the scheduler is used to compute the neuron activation miss ratio when mapping a 4042 core logical network onto a given number of physical processors (16 and 64 physical processors) using the minimum crossbar switch scheduling algorithm described above. The queue depth is sequentially decreased from an infinite queue length to a queue of length equal to 1 unit. These plots provide an estimation of the amount of neuron activations that can be kept on-chip for a finite queue size, thus giving us an estimate of the amount of data movement and bandwidth required to move neuron activations from off-chip memory/cache for on-chip processing. As these graphs show, the marginal utility of a longer queue decreases with the queue length.

Figure 14:
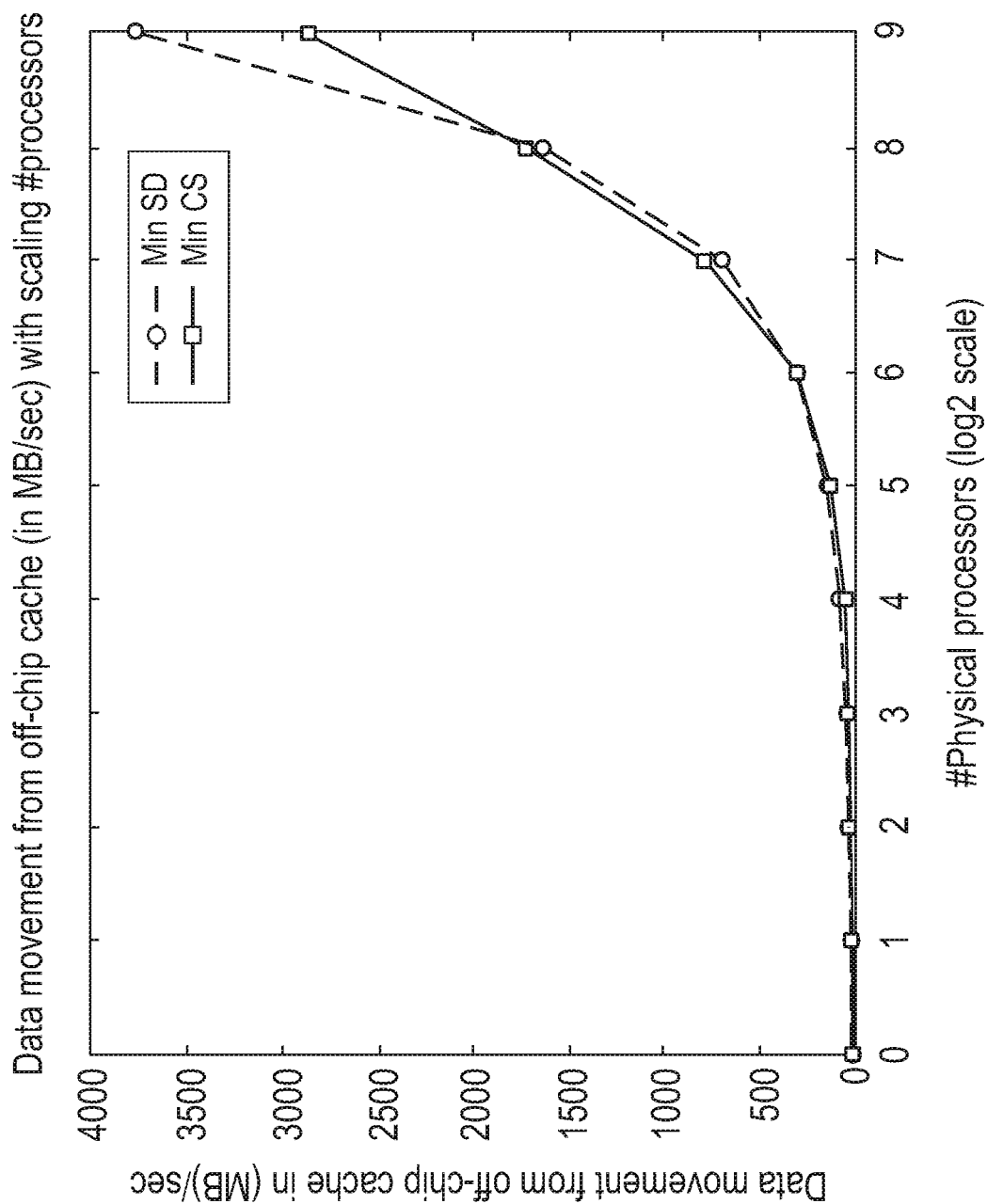
FIGS. 14-15 are charts of the amount of data movement relative to number of physical processors for minimum scheduling delay and minimum crossbar switch algorithms according to embodiments of the present disclosure.
Figure 15:
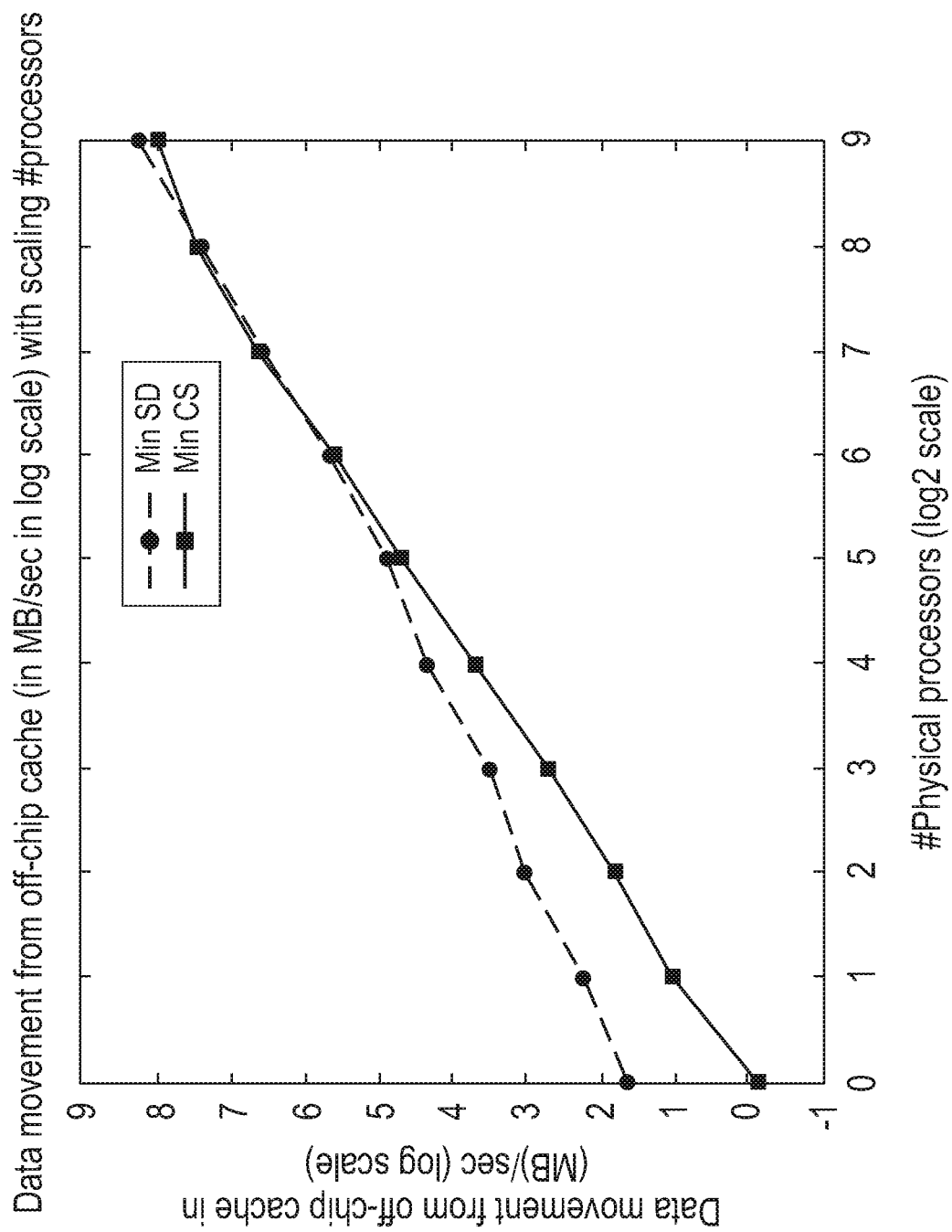

Referring to FIGS. 14-15, the amount of data movement (due to crossbar switches and neurons being re-programmed) is charted relative to number of physical processors for the minimum scheduling delay and minimum crossbar switch algorithms. In this example, a 4042 core logical network is mapped onto a variable number of physical processors (shown in the X-axis). FIG. 14 shows the net amount of data movement in MB. FIG. 15 shows the amount of data movement from off-chip cache to on-chip memory (e.g., SRAM) in MB/sec.

Figure 16:
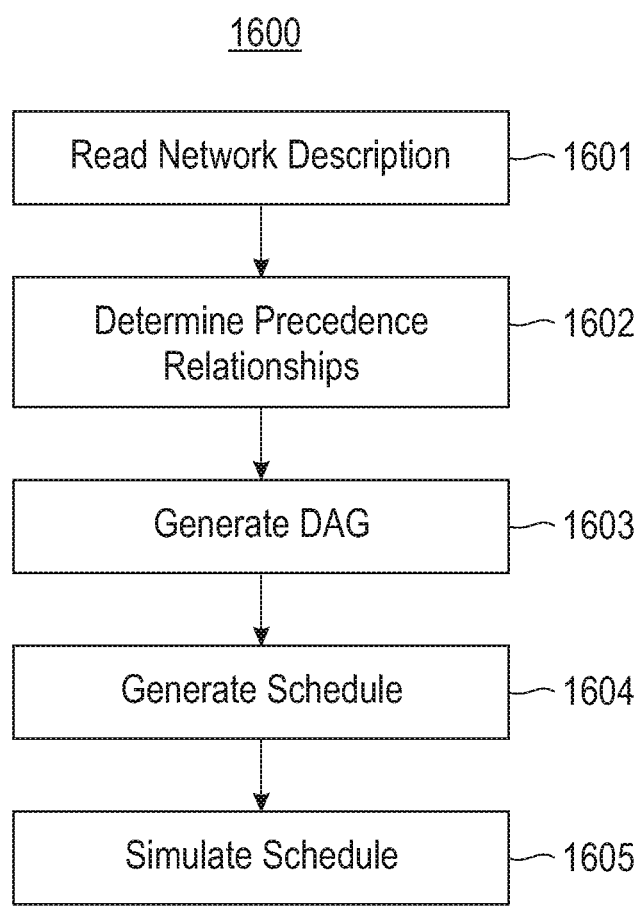
FIG. 16 illustrates a method for mapping logical neural cores to physical neural cores according to embodiments of the present disclosure.

Referring to FIG. 16, a method of mapping logical to physical cores is illustrated according to embodiments of the present disclosure. At 1601, a neural network description describing a plurality of logical cores is read. At 1602, a plurality of precedence relationships is determined among the plurality of logical cores. At 1603, based on the plurality of precedence relationships, a directed acyclic graph among the plurality of logical cores is generated. At 1604, by breadth first search of the directed acyclic graph, a schedule is generated. The schedule maps each of the plurality of logical cores to one of a plurality of physical cores at one of a plurality of time slices. At 1605, execution of the schedule is simulated.

As set out above, in various embodiments, systems and methods are provided for mapping neural computations onto a neural inference engine comprising of a set of neural cores. In various embodiments, the scheduler defines the precedence relationship of each node in a DAG of a neural graph and schedules it using BFS. In various embodiments, the scheduler defines the memory transaction model between the central chip memory and the crossbar memory. In various embodiments, the scheduler ensures memory coherency and avoids memory conflicts and generates addresses for memory addressing. In various embodiments, the scheduler minimizes energy use by maximizing cross bar re-use patterns. In various embodiments, the scheduler minimizes the overall schedule length of the mapping of neural computation to the cores.

In various embodiments, the scheduler schedules the runtime delivery of parameters, weights, instructions and/or activations from a global memory to a crossbar memory under the constraints of available throughput and latency. In various embodiments, the scheduler schedules the delivery of output activations from the crossbar to the global memory under the constraints of available throughput and latency.

In various embodiments, the schedule generated by the scheduler is simulated. In various embodiments, the simulator provides a tensor to tensor verification check against the training framework. In various embodiments, the simulator checks for consistency of memory access patterns and memory access conflicts. In various embodiments, the simulator provides statistics of hardware resources (e.g., hardware counters, HW ports, read/write accesses).

Figure 17:
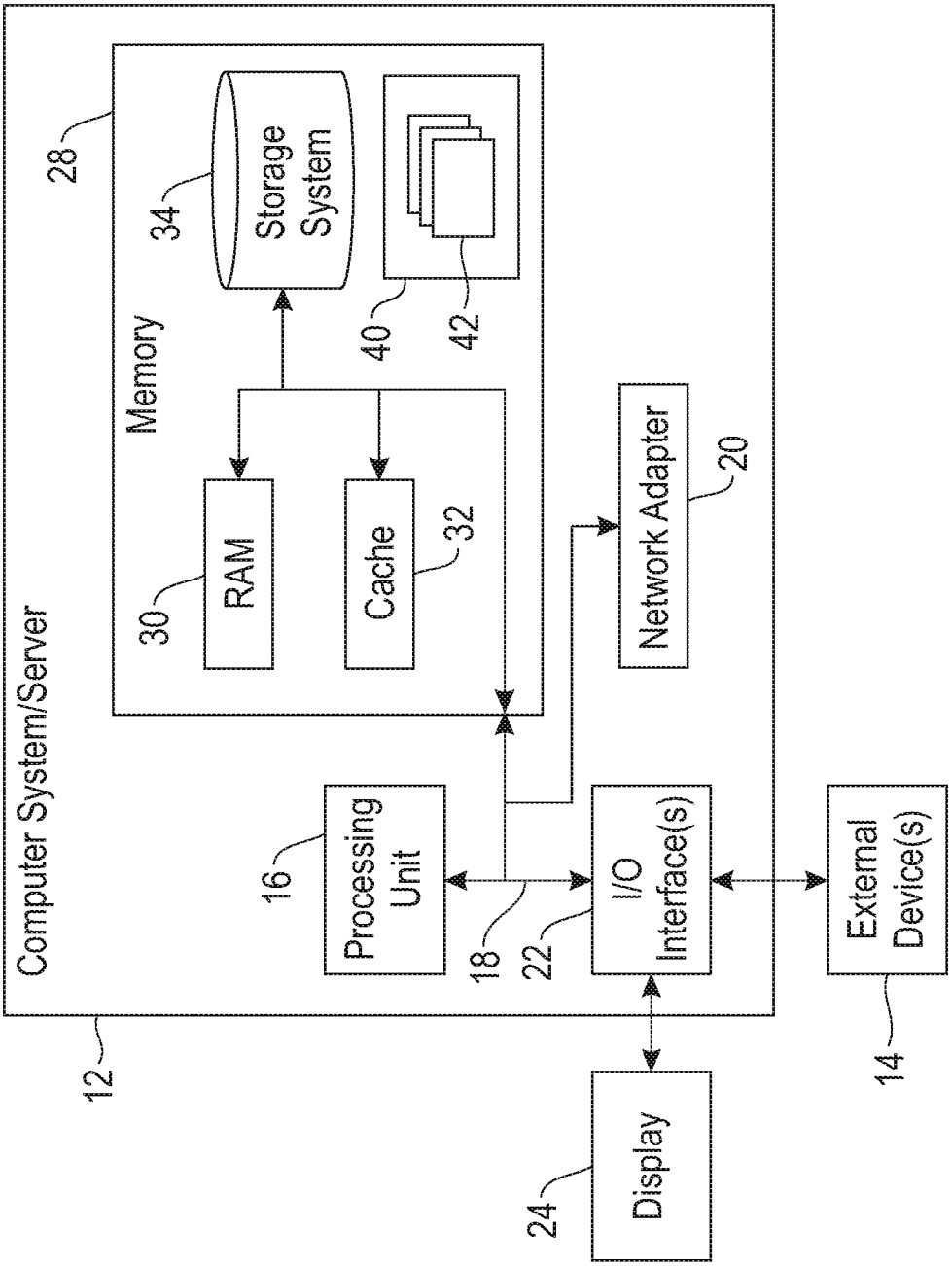
FIG. 17 depicts a computing node according to an embodiment of the present disclosure.

Referring now to FIG. 17, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 17, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
reading a neural network description describing a plurality of logical cores, wherein each of the plurality of logical cores comprises a crossbar template, each crossbar template comprising synaptic weights for its logical core;
determining a plurality of precedence relationships among the plurality of logical cores;
based on the plurality of precedence relationships, generating a directed acyclic graph among the plurality of logical cores;
by breadth first search of the directed acyclic graph, generating a schedule, the schedule mapping each of the plurality of logical cores to one of a plurality of physical cores at one of a plurality of time slices, wherein generating the schedule comprises maximizing crossbar template reuse for the plurality of physical cores.

2. The method of claim 1, further comprising:
executing the plurality of logical cores by the plurality of physical cores according to the schedule.

3. The method of claim 2, wherein said executing buffering input activations at each of the plurality of physical cores.

4. The method of claim 1, wherein generating the schedule comprises minimizing scheduling delay.

5. The method of claim 1, wherein the plurality of logical cores number more than the plurality of physical cores.

6. The method of claim 1, further comprising:
determining a queue depth for each of the plurality of physical cores.

7. The method of claim 6, wherein determining the queue depth comprises simulating execution of the schedule.

8. The method of claim 7, wherein simulating execution of the schedule comprises simulating the plurality of logical processors on the plurality of physical processors.

9. The method of claim 8, wherein simulating execution of the schedule comprises maintaining a processor queue for each of the plurality of physical processors.

10. The method of claim 9, further comprising: inserting a spike into the processor queue for each of the plurality of physical processors for each predecessor of that physical processor.

11. The method of claim 10, further comprising: computing the queue depth based on the state of the processor queue for each of the plurality of physical processors during a simulated run of the schedule.

12. A computer program product for mapping logical neural cores to physical neural cores, the computer program product comprising a computer readable storage medium having program instructions embodied therewith, the program instructions executable by a processor to cause the processor to perform a method comprising:
reading a neural network description describing a plurality of logical cores, wherein each of the plurality of logical cores comprises a crossbar template, each crossbar template comprising synaptic weights for its logical core;
determining a plurality of precedence relationships among the plurality of logical cores;
based on the plurality of precedence relationships, generating a directed acyclic graph among the plurality of logical cores;
by breadth first search of the directed acyclic graph, generating a schedule, the schedule mapping each of the plurality of logical cores to one of a plurality of physical cores at one of a plurality of time slices, wherein generating the schedule comprises maximizing crossbar template reuse for the plurality of physical cores.

13. A system comprising:
a plurality of physical neural cores;
a computing node comprising a computer readable storage medium having program instructions embodied therewith, the program instructions executable by a processor of the computing node to cause the processor to perform a method comprising:
reading a neural network description describing a plurality of logical cores, wherein each of the plurality of logical cores comprises a crossbar template, each crossbar template comprising synaptic weights for its logical core;
determining a plurality of precedence relationships among the plurality of logical cores;
based on the plurality of precedence relationships, generating a directed acyclic graph among the plurality of logical cores;
by breadth first search of the directed acyclic graph, generating a schedule, the schedule mapping each of the plurality of logical cores to one of the plurality of physical cores at one of a plurality of time slices, wherein generating the schedule comprises maximizing crossbar template reuse for the plurality of physical cores;
providing the schedule to the plurality of physical neural cores for execution.

14. The system of claim 13, the method further comprising:
executing the plurality of logical cores by the plurality of physical cores according to the schedule.

15. The system of claim 13, wherein generating the schedule comprises minimizing scheduling delay.

16. The system of claim 13, wherein the plurality of logical cores number more than the plurality of physical cores.

17. The system of claim 13, the method further comprising:
determining a queue depth for each of the plurality of physical cores, wherein
determining the queue depth comprises simulating execution of the schedule.

18. The system of claim 17, wherein simulating execution of the schedule comprises simulating the plurality of logical processors on the plurality of physical processors.

19. The system of claim 18, wherein simulating execution of the schedule comprises maintaining a processor queue for each of the plurality of physical processors.

20. The system of claim 19, the method further comprising:
inserting a spike into the processor queue for each of the plurality of physical processors for each predecessor of that physical processor.

* * * * *